US006803734B2

(12) United States Patent
Kumar et al.

(10) Patent No.: US 6,803,734 B2
(45) Date of Patent: Oct. 12, 2004

(54) METHOD FOR ELIMINATING FUEL USE DURING DYNAMIC BRAKING

(75) Inventors: Ajith Kuttannair Kumar, Erie, PA (US); Peter Loring Valentine, Erie, PA (US)

(73) Assignee: General Electric Company, Erie, PA (US)

( * ) Notice: Subject to any disclaimer, the term of this patent is extended or adjusted under 35 U.S.C. 154(b) by 0 days.

(21) Appl. No.: 10/160,867

(22) Filed: May 31, 2002

(65) Prior Publication Data

US 2003/0222611 A1 Dec. 4, 2003

(51) Int. Cl.[7] .............................. H02P 3/12; H02P 3/14; H02P 3/18
(52) U.S. Cl. ...................... 318/375; 318/254; 318/362; 318/382; 318/151; 318/152; 318/153
(58) Field of Search ................................. 318/254, 139, 318/375, 362, 140, 376, 258, 269, 151, 152, 156; 290/40 A, 40 B, 40 C, 40 R, 34, 45, 17; 60/39.281; 701/110, 112, 103, 104; 123/352, 357, 478, 446

(56) References Cited

U.S. PATENT DOCUMENTS

| 3,585,473 A | * | 6/1971 | Huxtable et al. ........... 318/140 |
| 4,634,887 A | * | 1/1987 | Balch et al. ................... 290/3 |
| 5,170,105 A | | 12/1992 | Kumar et al. |
| 5,801,499 A | * | 9/1998 | Tsuzuki et al. ............. 318/141 |
| 5,826,563 A | | 10/1998 | Patel et al. |
| 5,992,950 A | * | 11/1999 | Kumar et al. ............... 303/151 |
| 6,023,137 A | | 2/2000 | Kumar et al. |

OTHER PUBLICATIONS

L. Moklegaard, A.G. Stefanopoulou and J. Schmidt; *Transition from Combustion to Variable Compression Braking*; SAE 2000 World Congress; Mar., 2000; Document No. 2000–01–1228; USA.

* cited by examiner

*Primary Examiner*—David Martin
(74) *Attorney, Agent, or Firm*—Carl A. Rowold, Esq.; Terry M. Sanks, Esq.; Beusse Brownlee Wolter Mora & Marie, P.A.

(57) ABSTRACT

A dynamic braking system for a vehicle, the system comprising an engine, an alternator, a plurality of alternating current (AC) electric traction motors, each coupled in driving relationship to a respective one of a plurality of driven wheels, a plurality of power inverters where each of the traction motors has excitation windings coupled in circuit with a corresponding one of the plurality of power inverters, a fuel-free dynamic braking controller, a fuel-free dynamic braking transfer switch located between one of the plurality of traction motors and the one of the plurality of power inverters in circuit with the corresponding one of the plurality of power inverters, wherein the one of the plurality of traction motors in circuit with the corresponding one of the plurality of power inverters that is separated by the fuel-free dynamic braking transfer switch does not generate and does not consume power, and wherein the fuel-free dynamic braking controller commands one of the plurality of power inverters that is separated by the fuel-free distributed braking transfer switch from one the traction motor to convert direct current (DC) power into AC power for use by the vehicle.

13 Claims, 6 Drawing Sheets

Providing a dynamic braking system comprising an engine, an alternator, a plurality of alternating current electric traction motors, and a plurality of power inverters where each of said traction motors has excitation windings coupled in circuit with a corresponding one of said plurality of power inverters Providing a fuel-free dynamic braking controller — 52

Providing a fuel-free dynamic braking transfer switch — 54

Placing a vehicle's power level into a dynamic braking mode — 56

Activating said fuel-free dynamic braking transfer switch — 58

Allowing said fuel-free dynamic braking controller to command at least one of said inverters to convert DC power produced by a remaining of said inverters into AC power — 60

Preventing one of said plurality of traction motors in circuit with said corresponding one of said plurality of power inverters that is separated by said fuel-free dynamic braking transfer switch from generating and consuming power — 62

Rotating at least one of said alternator and said engine produce power — 64

Reducing an amount of fuel supplied to said engine — 66

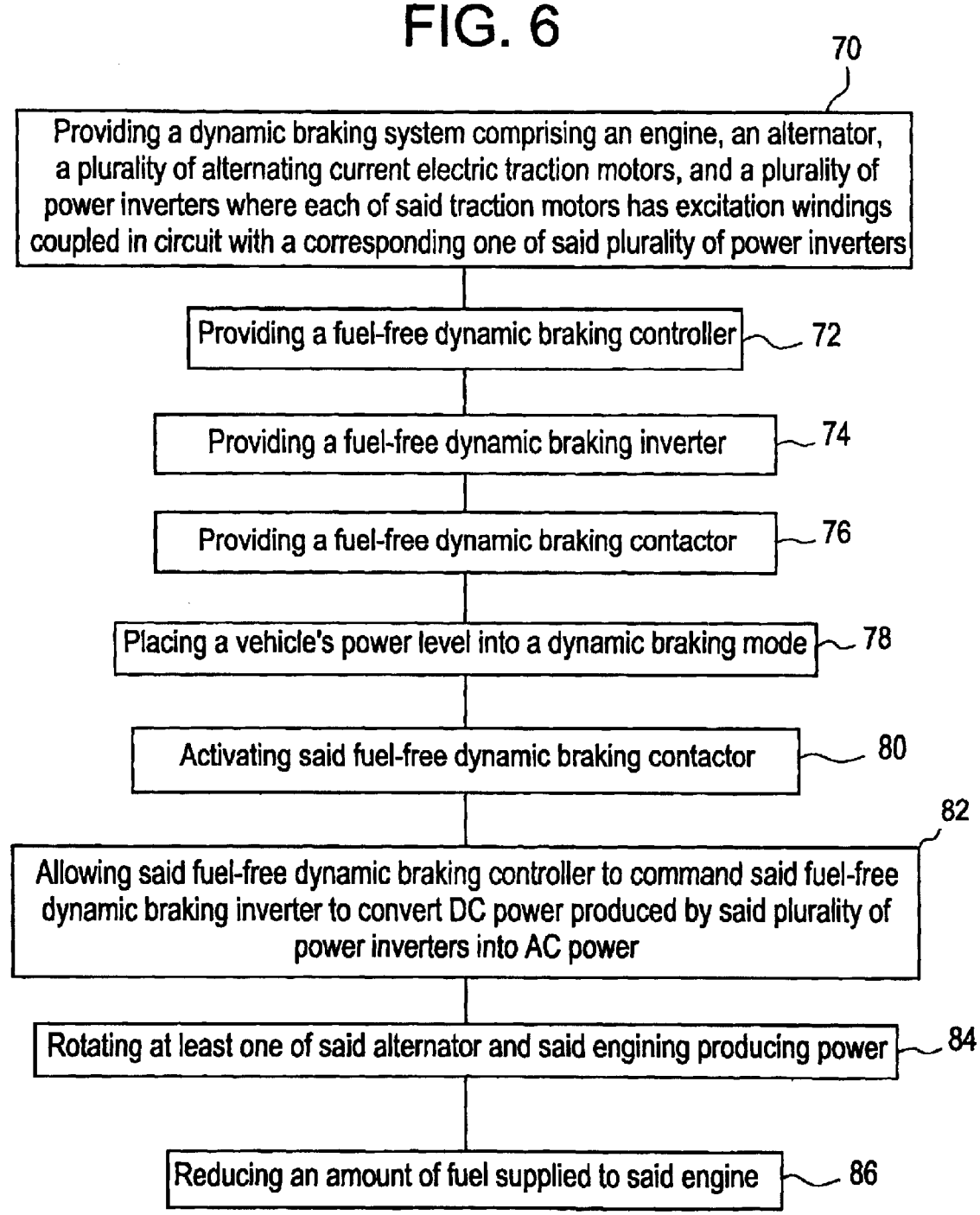

METHOD FOR ELIMINATING FUEL USE DURING DYNAMIC BRAKING

BACKGROUND OF THE INVENTION

This invention relates to a braking system, and more specifically, to a system and method for eliminating fuel use and increasing the maximum braking effort of a particular kind of rail locomotive or off-highway vehicle while in a dynamic braking state.

Diesel electric locomotives generally have two means for slowing a train, where a train consists of at least one locomotive and one rail car, when a need arises. A first means is to apply air brakes that when engaged apply brake shoes to the wheels of a locomotive and/or rail cars to convert the kinetic energy of the train's motion into heat in the wheels, brake shoes and rails. A second means is referred to as "Dynamic Braking" (or DB). In dynamic braking, the electric traction motors of a locomotive are used to slow the train by applying tractive effort to the rail in a direction that produces deceleration of the train. This is accomplished by electrically reconfiguring the traction motors as alternators, when AC traction motors are used, and by dissipating the electrical energy that is produced by rectifying the AC current to DC and heating a large volume of air using electric fans and resistive heating elements. The train is slowed because the energy dissipated is provided by a reduction in the kinetic energy of motion, and thus the speed, of the locomotive and the rail cars. Though it would be highly advantageous to store the energy produced by the traction motors in DB for later use, the high capital cost of the necessary energy storage components has heretofore rendered such a system economically unattractive.

Dynamic braking is used for moderate slowing, in place of the rail car air brakes, and for maximum braking in conjunction with the rail car air brakes. Although dynamic braking functions similar to shoe brakes in converting electric energy into heat, there is little required maintenance with a dynamic braking system other than periodic replacement of the brushes in the DC fan motors. Dynamic braking thus provides cost savings to an operator in contrast with shoe brakes, which inevitably wear and require adjustment and replacement with use.

Another alternative to shoe brakes is used only with vehicles having mechanical transmissions and is known as compression braking or compression retarding. Compression braking is based on rotating the engine with energy supplied by torque from the wheels during deceleration, turning off the fuel, and altering the exhaust valve opening to turn the engine into a compressor. Because the compressed and heated air is discarded to the environment, the engine acts as an energy sink when compression braking is activated and slows the vehicle.

When a locomotive or off highway vehicle with AC traction motors slows in Dynamic Braking, the engine continues to consume fuel to meet the electrical needs of the vehicle. On an AC locomotive, for example, this includes power for the traction motor blowers, radiators fan(s), air compressor, operator cab heater or air conditioner, alternator blower, eductor blower, and battery charging circuit, among others.

There are conditions where the rotational speed of a vehicle's wheels differs from that associated with 'rolling contact' between the wheel and the driving surface. In common parlance, if the periphery of a wheel moves faster than the speed of the vehicle, as during hard acceleration, the condition is known as wheel-spin or wheel-slip, and if the periphery of the wheel moves slower than the speed of the vehicle, as during hard braking, the condition is known as wheel-slide, or in the extreme, locked wheels. In either case, the condition should be avoided because damage can be done to the wheels and/or driving surface when these occur. Moreover, when it is imperative that a rapid vehicle stop be made, as for example when approaching a bridge that has failed, the maximum deceleration will occur only if the wheel(s) periphery speed is close to the speed of the vehicle. In other words, if the rotation of the wheel slows or stops and sliding ensues, the vehicle will take longer to stop. Accordingly, locomotive, off-highway, and some road vehicles contain anti-slip and anti-slide control which compares the rotational speed of the wheels against a measured or calculated vehicle speed and which actively reduces the torque to the wheels momentarily to re-establish rolling contact between the wheels and the driving surface. The control then reapplies torque to achieve the desired acceleration or deceleration of the vehicle without allowing wheel slip or wheel-slide. Under conditions of maximum acceleration or deceleration on slippery surfaces, the anti-slip or anti-slide control may vary the torque at the wheels many times a second to preserve rolling contact and provide maximum performance.

Manufacturers and operators of locomotives and off highway vehicles would benefit from a system which would eliminate or greatly reduce the use of fuel when in a dynamic braking mode where power is still needed to operate an engine, alternator and/or auxiliary alternator.

BRIEF DESCRIPTION OF THE INVENTION

Towards this end, the present invention discloses a dynamic braking system for a vehicle. The system comprises an engine, an alternator, a plurality of alternating current (AC) electric traction motors each coupled in driving relationship to a respective one of a plurality of driven wheels, and a plurality of power inverters where each of the traction motors has excitation windings coupled in circuit with a corresponding one of the plurality of power inverters. The system also comprises a fuel-free dynamic braking controller and a fuel-free dynamic braking transfer switch located between one of the plurality of traction motors and the one of the plurality of power inverters in circuit with the corresponding one of the plurality of power inverters. In this system, one of the plurality of traction motors formerly in circuit with the corresponding one of the plurality of power inverters that is separated by the fuel-free dynamic braking transfer switch does not generate and does not consume power. Additionally, the fuel-free dynamic braking controller commands one of the plurality of power inverters that is separated by the fuel-free distributed braking transfer switch from the one traction motor to convert direct current (DC) power into AC power for use by the vehicle.

In another preferred embodiment, the present invention discloses a dynamic braking system for a vehicle comprising an engine, an alternator, a plurality of alternating current (AC) electric traction motors each coupled in driving relationship to a respective one of a plurality of driven wheels, and a plurality of power inverters where each of the traction motors has excitation windings coupled in circuit with a corresponding one of the plurality of power inverters. The system further comprises a fuel-free dynamic braking controller and a fuel-free dynamic braking inverter. In the system the fuel-free dynamic braking inverter converts direct current (DC) power into AC power for use by the vehicle.

The present invention also discloses a method for reducing fuel use and increasing a maximum braking effort of a vehicle when in dynamic braking. The method comprises providing a dynamic braking system comprising an engine, an alternator, a plurality of alternating current electric traction motors, and a plurality of power inverters where each of the traction motors has excitation windings coupled in circuit with a corresponding one of the plurality of power inverters. The method also comprises providing a fuel-free dynamic braking controller and providing a fuel-free dynamic braking transfer switch. The method further comprises placing a vehicle's power level into a dynamic braking mode, activating the fuel-free dynamic braking transfer switch, and allowing the fuel-free dynamic braking controller to command at least one of the inverters to convert DC power produced by a remaining of the inverters into AC power. The method also prevents at least one of the traction motors from generating and consuming power, rotates the alternator and the engine to produce power, and reduces the amount of fuel supplied to the engine.

The present invention further discloses another preferred method for reducing fuel use and increasing a maximum braking effort of a vehicle when in dynamic braking. This method comprises providing a dynamic braking system comprising an engine, an alternator, a plurality of alternating current electric traction motors, and a plurality of power inverters where each of the traction motors has excitation windings coupled in circuit with a corresponding one of the plurality of power inverters. Also provided are a fuel-free dynamic braking controller, a fuel-free dynamic braking inverter, and a fuel-free dynamic braking contactor. The method also places a vehicle's power level into a dynamic braking mode and activates the fuel-free dynamic braking contactor. The method further allows the fuel-free dynamic braking controller to command the fuel-free dynamic braking inverter to convert DC power produced by the plurality of power inverters into AC power. The method also rotates at least one of the alternator and the engine to produce power, and reduces the amount of fuel supplied to the engine.

DESCRIPTION OF THE DRAWINGS

The features and advantages of the present invention will become apparent from the following detailed description of the invention when read with the accompanying drawings in which:

FIG. 5 is an exemplary flow chart of illustrative steps employed in the present invention; and FIG. 6 is an exemplary flow chart of illustrative steps employed in the present invention.

DETAILED DESCRIPTION OF THE INVENTION

With reference to the figures, exemplary embodiments of the invention will now be described. Although this invention is disclosed specific to a dynamic braking system on a locomotive, this invention is applicable to other dynamic braking systems in general, for example those used on road or off-highway vehicles with AC traction motors and traction motor inverters. Additionally this invention is disclosed as being used with a vehicle having six traction motors. This invention is also applicable to vehicles having other than six traction motors.

Figure 1:
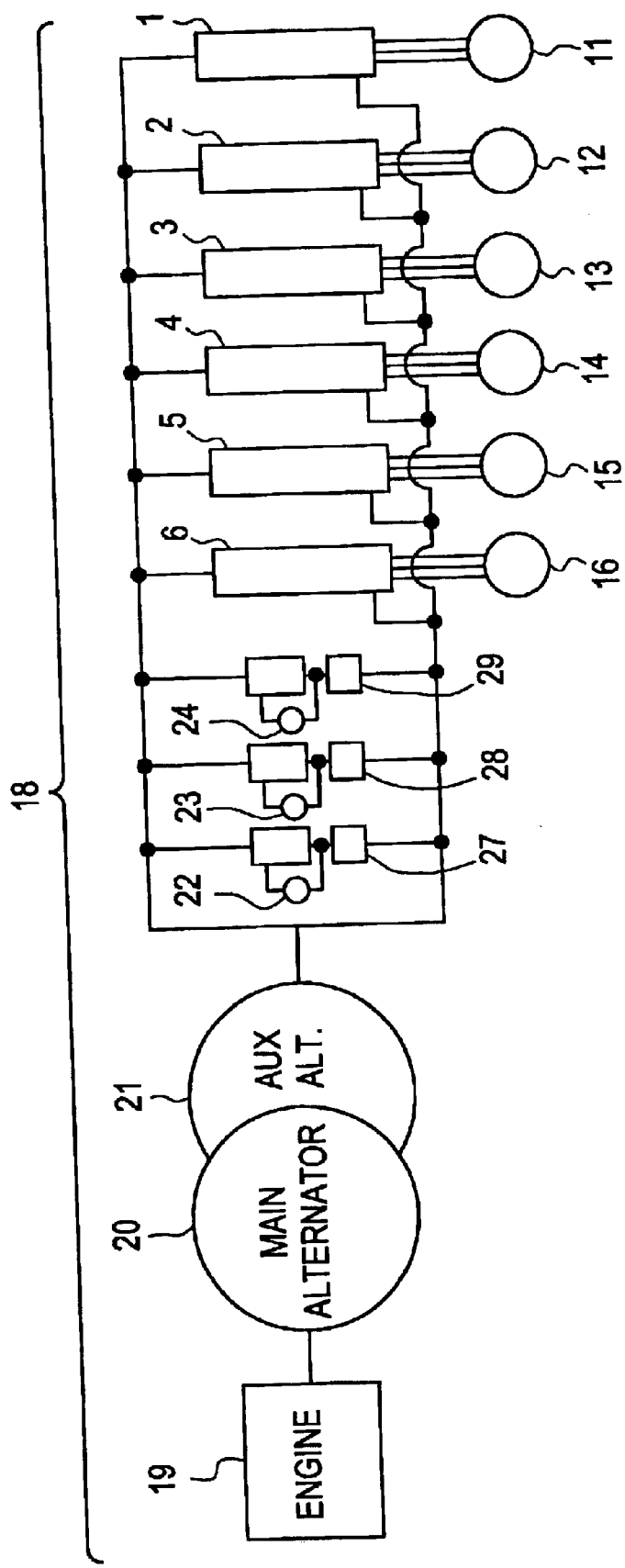
FIG. 1 is an exemplary simplified block diagram of a locomotive and several components common in a prior art dynamic braking system.
Figure 2:
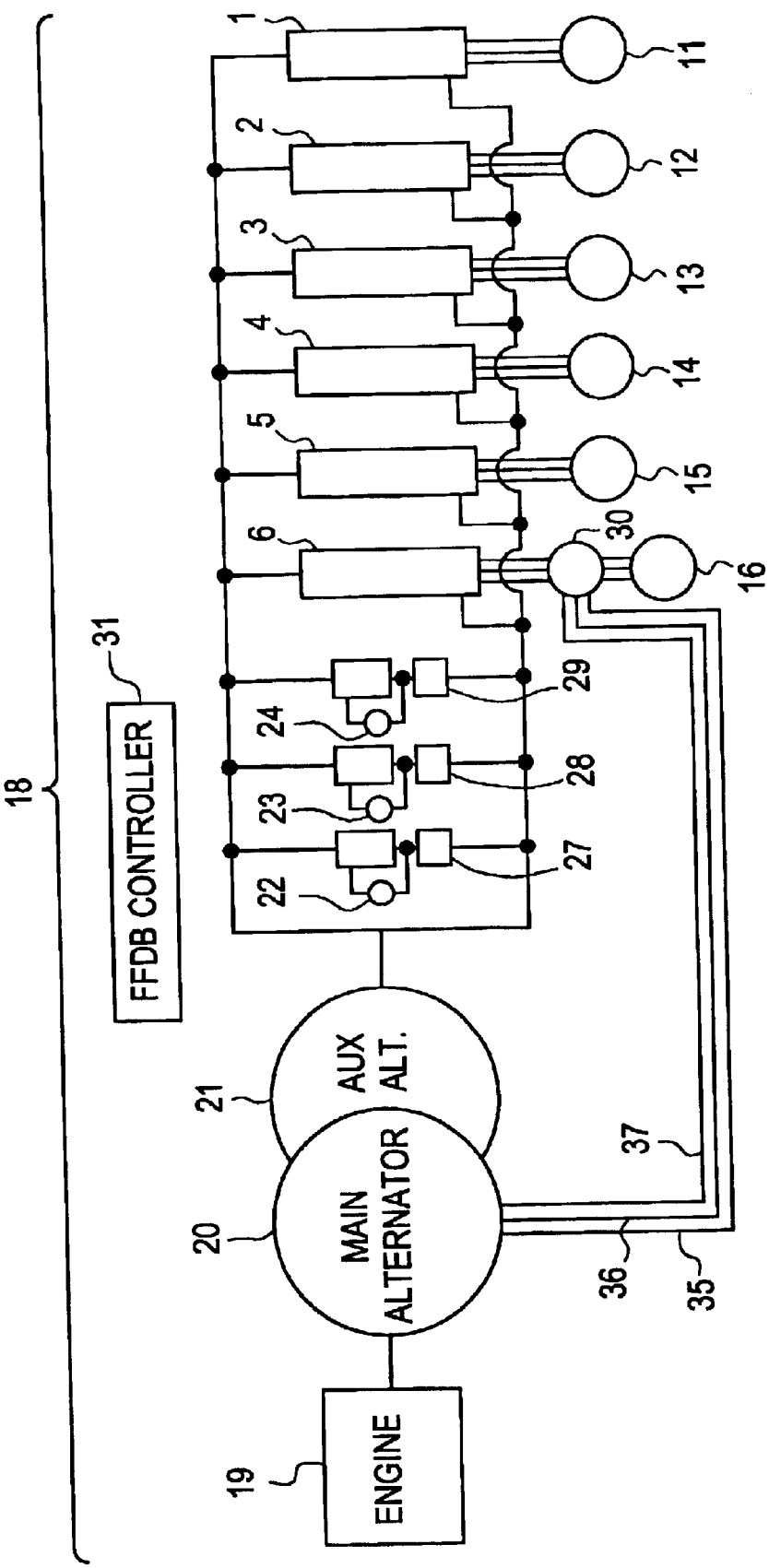
FIG. 2 is an exemplary simplified block diagram of an AC locomotive block diagram, wherein a Fuel Free Dynamic Braking (FFDB) transfer switch and Fuel-Free Dynamic Braking controller are included.

FIG. 1 is an exemplary simplified block diagram of a locomotive and several components common in a prior art dynamic braking system, and FIG. 2 is an exemplary more detailed block diagram of a prior art AC locomotive power transmission and dynamic braking system. In FIG. 1, an AC locomotive 18 in motoring operation produces AC power where a main or traction motor alternator 20 is turned by a diesel engine 19. The traction motor alternator 20 AC output is rectified to direct current (DC) power and is then "inverted" by traction motor inverters 1, 2, 3, 4, 5, 6 to provide three-phase AC power at a frequency dependent on train speed, which is sent to the traction motors 11, 12, 13, 14, 15, 16 to accelerate the locomotive 18 and thus the train, and maintain speed despite grade, rolling and dynamic resistance. The engine 19 also turns an auxiliary alternator 21 to supply power for vehicle needs such as excitation, traction motor and equipment blowers, radiator fans, air compressors, cab heating or air conditioning, lights and battery charging both in normal operation and during dynamic braking.

When in a dynamic braking mode, the traction motors 11, 12, 13, 14, 15, 16 are reconfigured to produce three-phase AC, and this is rectified to DC and switched to the dynamic braking resistor grids 27, 28, 29 and the DC blowers 22, 23, and 24. A continuous flow of air is supplied by the blowers and then heated by the resistor grids to dissipate the energy produced by the traction motors 11, 12, 13, 14, 15, 16. During dynamic braking, the engine 19, typically a diesel engine, must turn at elevated speeds to maintain auxiliary alternator 21 speed to supply all the locomotive 18 power needs, thus consuming fuel to supply auxiliary power required by the locomotive 18.

FIG. 2 is an exemplary illustration of an AC locomotive block diagram, wherein a Fuel-Free Dynamic Braking (FFDB) transfer switch 30 is included between traction motor 16 and inverter 6. With the addition of the FFDB transfer switch 30, AC power from the traction motors 11, 12, 13, 14, 15 flows to the traction motor inverters 1, 2, 3, 4, 5, where it is rectified to DC power. Traction motor 16 is disconnected from the locomotive 18 and neither generates nor consumes power. The FFDB controller 31 commands inverter 6 to convert an increasing amount of the DC power available from inverters 1,2,3,4,5 into AC power to rotate the main alternator 20, the engine 19, and the auxiliary alternator 21 to produce auxiliary power with reduced fuel use. The FFDB controller 31 simultaneously reduces engine 19 fuel injection duration to maintain the same prescribed revolutions per minute as a conventional locomotive dynamic braking system. The desired goal is attained when fuel use is virtually zero. This occurs because the auxiliary alternator supplies all the locomotive's power needs as the auxiliary alternator, main alternator and engine are rotated with formerly wasted power that was dissipated by the resistor grids and blowers. In a preferred embodiment, three cables 35, 36, 37 carry the AC power from inverter 6, through the transfer switch 30 to the main alternator 20.

Figure 3:
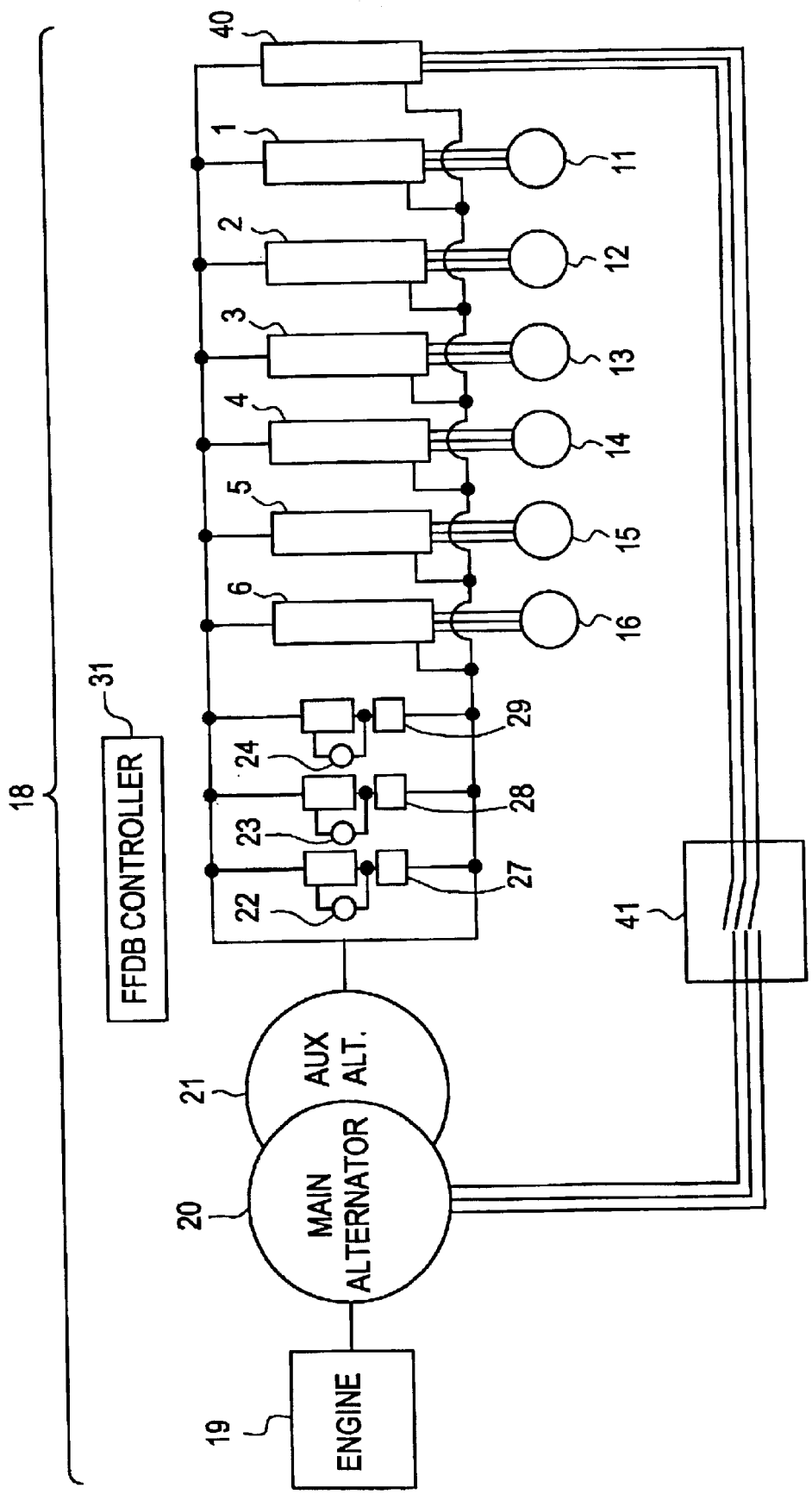
FIG. 3 is an exemplary simplified block diagram of another embodiment of an AC locomotive block diagram in accordance with this invention.
Figure 4:
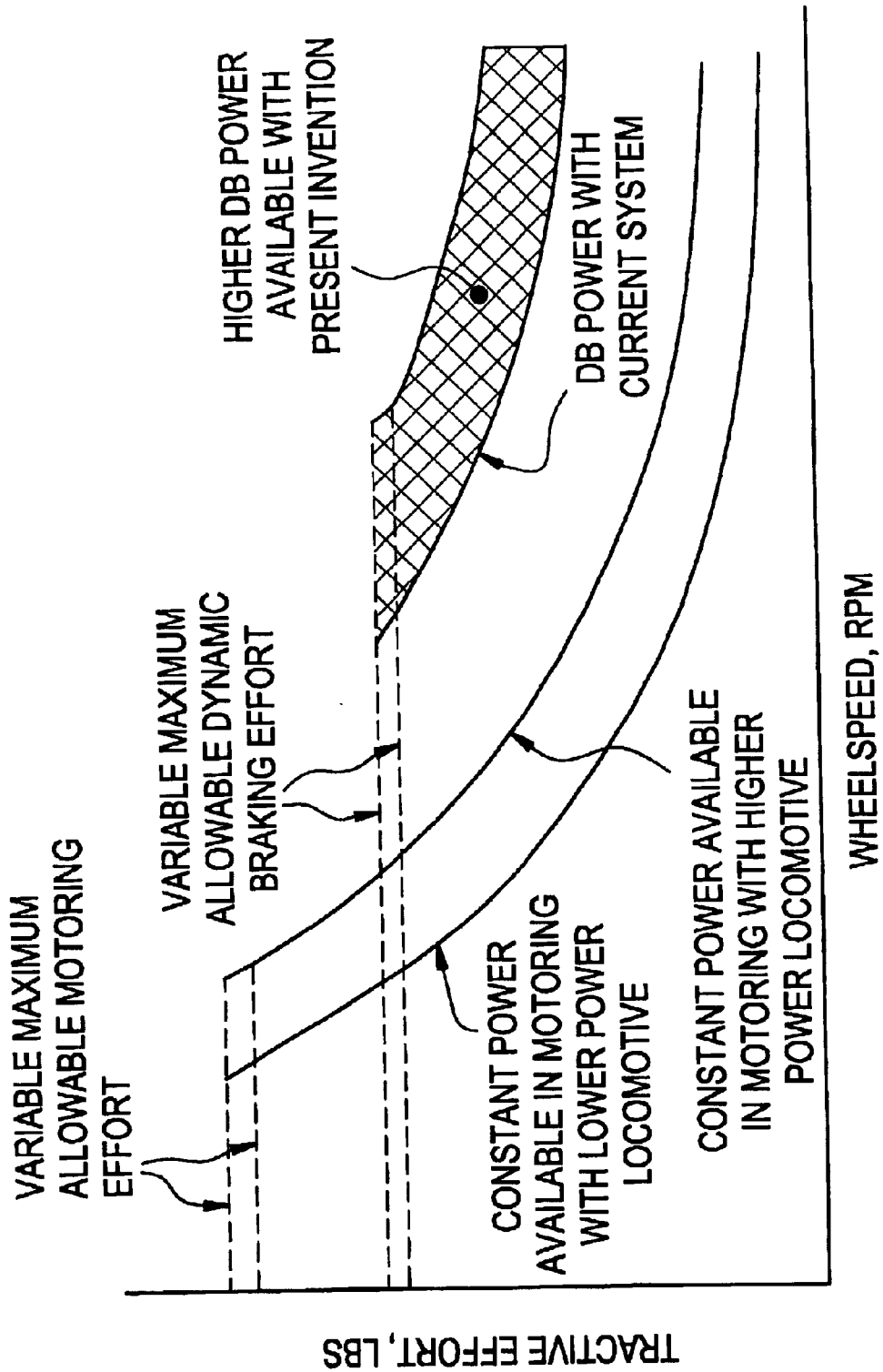
FIG. 4 is an exemplary graph illustrating how an FFDB system can lead to higher dynamic braking effort.

FIG. 3 is an exemplary embodiment of another embodiment of an AC locomotive block diagram in accordance with this invention. As illustrated in FIG. 4, an additional inverter 40 and a contactor 41 are included in the system, otherwise known as FFDB inverter 40 and FFDB contactor 41, respectively. The primary difference between the invention disclosed in FIG. 2 and FIG. 3 is that the invention disclosed in FIG. 2 makes traction motor 16 unavailable for generating power (and slowing the vehicle) in dynamic braking mode but does not require an additional inverter 40. Because an additional inverter 40 is provided in FIG. 3, the maximum retarding force that may be applied to the locomotive 18 and train at high speeds will be at least the same or greater than that possible in the prior art disclosed in FIG. 1.

With respect to the invention disclosed in FIGS. 2 and 3, when an operator moves a vehicle's power level into a dynamic braking range during operation, the FFDB controller 31 first checks the speed of the locomotive and the level of dynamic braking requested to determine whether to switch the FFDB transfer switch 30 (FIG. 2) or to activate the FFDB inverter 40 and contactor 41 (FIG. 3) to rotate the main alternator, engine, and auxiliary alternator to provide auxiliary power without fuel use. For predetermined combinations of low vehicle speeds and high dynamic braking notch level, the FFDB controller 31 will not engage an FFDB system because it is anticipated that there is or will soon be too little power to spin the main alternator, engine, and auxiliary alternator, or in other words, the vehicle may soon stop.

Alternatively, at predetermined combinations of train speed and dynamic brake notch level, the FFDB controller 31 calculates that there is more than enough power available from the traction motors to turn the main alternator, engine, and auxiliary alternator at the speed required to satisfy the vehicles electrical power needs and activates the present invention. In this instance, AC power will be gradually applied to the main or traction motor alternator to provide torque to both the auxiliary alternator and the engine. As torque is applied to the engine, the FFDB controller proportionately cuts fuel to the engine to maintain the prescribed revolutions per minute (RPM) for the auxiliary alternator. The desired fuel saving goal is achieved when the fuel is cut off completely and the auxiliary alternator is supplying all locomotive electrical needs.

In order for the FFDB system to function stably, and provide maximum fuel savings, it is important that the FFDB controller 31 only activate the present invention when there is more than enough traction motor power to turn the alternator, engine and auxiliary alternator at the speed and torque required for the auxiliaries. To better understand, consider the present invention as disclosed in FIG. 3 and FIG. 4, but suppose that there is only enough vehicle speed to supply the vehicles' power needs and no excess power that could be dissipated in the DB resistors 27, 28, 29 and blowers 22, 23, 24. Suppose further that one or more of the vehicle's wheels (not shown) begins to slide rather than turn, as could happen if the driving surface suddenly became slippery. If the vehicle 18 does not have a wheel-slide detection and correction system, the wheel will slide, the traction motors 11, 12, 13, 14, 15 will produce less power and therefore the power reaching the main alternator from the traction motor inverters 1, 2, 3, 4, 5 will reduce. This will reduce the torque on the engine 19 and auxiliary alternator 21 and in the absence of fuel use, will lead to the engine 19 rotating more slowly. This cannot be allowed because the engine 19 has cooling and oil lubrication systems (not shown) that require that engine rotation not drop below the 'idle' level without deleterious consequences. Accordingly, if the present invention is engaged when there is no excess power available over that required to rotate the main alternator 20, engine 19, and auxiliary alternator 21 at the proper speed, and traction motor power suddenly drops, there is no alternative but to feed fuel to the engine 19 to maintain the minimum prescribed revolutions per minute. The situation is similar if the vehicle 18 is equipped with a wheels-slide detection and correction system. Specifically, if a wheel-slip is detected, the anti-wheel-slide system will quickly cut back on the power from the slipping wheel's traction motor to allow the wheel to once again rotate. This will allow the engine 19 to slow, and fuel will have to be fed to the engine 19 to maintain prescribed revolutions per minute.

When the present invention is activated at higher train speeds and/or with a higher requested notch level, there will be more than enough power from the traction motors 11, 12, 13, 14, 15 to spin the engine 19 at the speed and torque necessary to supply all the auxiliary power needed by the vehicle 18. In such a case, the conventional Dynamic Braking electric fans 22, 23, 24 and resistive heating elements 27, 28, 29 will be used in addition to using the present invention in order to provide higher levels of braking that the vehicle operator (not shown) might command. Should wheel-slide occur with the present invention, working along with the conventional fans and heating elements, it is possible to nearly instantaneously lower the power dissipated by the heating elements and thus maintain the torque on the main alternator 20, engine 19 and auxiliary alternator 21 at a desirable steady level. Thus the conventional DB system will be used as a 'cushion' to allow the present invention to eliminate fuel use during DB despite varying power provided by the traction motors 11, 12, 13, 14, 15.

FIG. 4 is an exemplary graph illustrating how the present invention can be used to provide higher dynamic braking power. For example, a locomotive typically produces greater horsepower (but lower maximum tractive effort) in Dynamic Braking than is available from the diesel engine in motoring mode. Whether motoring or in Dynamic Braking, there are variable upper limits to tractive effort and this means that at low vehicle speeds not all the motor or Dynamic Braking equipment capability can be used. Tractive effort limits are variable because they are either based on equipment limitations, which may vary depending on how long the equipment is exposed to such conditions, or because the driving surface simply will not support any more tractive effort and 'slipping' or 'sliding' will result. At sufficiently high speeds, however, it is possible to increase either the motoring or DB horsepower by increasing the tractive effort without exceeding the tractive effort limit as shown on the right hand side of FIG. 4. Therefore, if the present invention is incorporated in an AC locomotive or vehicle with a similar power transmission system, and the normal DB equipment is retained, there will be increased braking horsepower available when the train speed is high enough to prevent the tractive effort limit from being reached. The crosshatched area of FIG. 4 indicates this increased horsepower DB region.

The present invention provides additional means of increasing the dynamic braking horsepower of suitable vehicles when vehicle speed is high. For sufficiently high wheel-speed in FIG. 4, it is possible to increase the braking force over that available with conventional DB equipment used with the present invention previously described. Because the present invention rotates the engine 19 to eliminate fuel use in DB as well as rotating the engine 19 to provide auxiliary alternator power, and because it draws this power from the traction motors, any extra torque load produced by the engine 19 will produce additional braking from the traction motors by exerting greater tractive effort at the wheels. One way of increasing the braking horsepower with the present invention used along with conventional DB resistor elements is to intentionally run some of the auxiliary motors at their highest speed when such speed is not necessary. This intentional "over-use" of the auxiliaries forces the FFDB controller 31 to consume more power from the traction motors 11, 12, 13, 14, 15 by rotating the main alternator 20, engine 19, and auxiliary alternator 21 at a higher speed and this causes the traction motors 11, 12, 13, 14, 15 to exert increased braking effort to the driving surface.

With the present invention in place, increased resistance to rotation at the engine causes increased resistance to rotation, and hence braking, at the traction motors. Because this is identical to the functioning of vehicles with mechanical transmissions, the addition of engine compression braking system, formerly only used with vehicles with mechanical transmissions, is made possible to vehicles using the present invention. There are many designs for compression braking systems. Some are designed to be added to existing engines while others are included as extra mechanisms within engines as they are built. The simplest systems are either 'on' or 'off', that is, when the system is engaged the fuel is shut off and one high level of compression braking or retardation is activated. A more advanced compression braking system is one in which the resistive torque of the engine can be varied from a minimum, equivalent to rotating the engine without fuel injection, to a maximum, equivalent to the highest compression braking possible. With the present invention in place, it is possible, unlike with mechanical transmissions, to vary the compression braking horsepower by raising or lowering the engine speed independently of the speed of the wheels.

Thus in operation, and as illustrated in FIG. 5, a dynamic braking system comprising an engine, an alternator, a plurality of alternating current electric traction motors, and a plurality of power inverters where each of said traction motors has excitation windings coupled in circuit with a corresponding one of said plurality of power inverters is provided, Step 50. The system also has a fuel-free dynamic braking controller, Step 52, and a fuel-free dynamic braking transfer switch, Step 54. The vehicle's power level is placed into a dynamic braking mode, Step 56. The fuel-free dynamic braking transfer switch is then activated, Step 58. The fuel-free dynamic braking controller commands one of the inverters to convert DC power produced by the remaining inverters into AC power, Step 60. The traction motor in circuit with the corresponding power inverter that is separated by the fuel-free dynamic braking transfer switch is prevent from generating and consuming power, Step 62. The power generated is used to rotate the alternator, auxiliary alternator, and engine to produce power to other vehicle systems, Step 64. The amount of fuel supplied to the engine is reduced during this process, Step 66.

As illustrated in FIG. 6, a dynamic braking system comprising an engine, an alternator, a plurality of alternating current electric traction motors, and a plurality of power inverters where each of said traction motors has excitation windings coupled in circuit with a corresponding one of said plurality of power inverters is provided, Step 70. The system also has a fuel-free dynamic braking controller, Step 72, a fuel-free dynamic braking contactor, Step 74, and a fuel-free dynamic braking inverter, Step 76. The vehicle's power level is placed in to a dynamic braking mode, Step 78. The fuel-free dynamic braking transfer contactor is then activated, Step 80. The fuel-free dynamic braking controller commands the fuel-free dynamic braking inverter to convert DC power produced by the other inverters into AC power, Step 82. The power generated is used to rotate the alternator, auxiliary alternator, and engine to produce power to other vehicle systems, Step 84. The amount of fuel supplied to the engine is reduced during this process, Step 86.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A dynamic braking system for an electro-motive vehicle for reduced engine fuel consumption during braking, said system comprising:
    (a) an engine;
    (b) a primary alternator connected to the engine for generating electrical power for motoring the vehicle;
    (c) a secondary alternator connected to the engine for generating electrical power for auxiliary equipment on the vehicle both during motoring and during dynamic braking;
    (d) a plurality of alternating current (AC) electric traction motors each coupled in driving relationship to a respective one of a plurality of driven wheels for driving the vehicle during motoring and generating electrical upon dynamic braking of the vehicle;
    (e) a plurality of power inverters electrically connected to the primary alternator and the plurality of traction motors, for receiving electrical power from the primary alternator and delivering electrical power to the traction motors for motoring the vehicle and receiving electrical from the traction motors and delivering electrical power during dynamic braking;
    (f) a dynamic braking inverter electrically connected to the traction motors to receive electrical power from the power inverters generated by the traction motors during dynamic braking and positioned in a switched circuit to selectively connect the dynamic braking inverter electrically with the primary alternator during dynamic braking;
    (g) a dynamic braking switch located in the switched circuit between the dynamic braking inverter and the primary alternator; and
    (h) wherein during dynamic braking of the vehicle the dynamic braking switch is closed and the dynamic braking inverter receives power, generated by the traction motors, that is delivered through the power inverters and transmits electrical power to the primary alternator to rotate the engine and drive the secondary alternator to power the auxiliary equipment on the vehicle during braking of the vehicle without fueling the engine.

2. The system of claim 1 wherein the dynamic braking inverter is further positioned in a switched circuit to selectively connect the dynamic braking inverter electrically with at least one traction motor to transmit power to said traction during motoring, and said braking system further comprises a motoring switch connected between the dynamic braking inverter and said traction motor.

3. The system of claim 2 wherein said dynamic braking switch is a three-way switch and further constitutes said motoring switch.

4. The system of claim 1 further comprises an engine controller controlling the delivery of fuel to the engine.

5. The system of claim 1 further comprising a dynamic braking controller for controlling the operation of the dynamic braking switch.

6. The system of claim 2 further comprising a dynamic braking controller for controlling the operation of the motoring switch.

7. The system of claim 4 further comprising a dynamic braking controller for controlling the operation of the engine controller.

8. The system of claim 1 further comprising a dynamic braking grid electrically connected to the power inverters for receiving power from the power inverters generated by the traction motors during braking and delivering power to the braking grid to be dissipated as beat at the grid.

9. A dynamic braking system for an electro-motive vehicle for reduced engine fuel consumption during braking, said system comprising:

(a) an engine;

(b) a primary electric power generator connected to the engine for generating electrical power for motoring the vehicle;

(c) a secondary electrical power generator connected to the engine for generating electrical power for auxiliary equipment on the vehicle both during motoring and during dynamic braking;

(d) a plurality of electric traction motors each coupled in driving relationship to a respective one of a plurality of driven wheels for driving the vehicle during motoring and generating electrical upon dynamic braking of the vehicle;

(e) a switched circuit electrically connected between the traction motors and the primary electrical power generator for selectively transmitting power generated at the traction motors during dynamic braking to the primary electrical power generator; and (f) a dynamic braking switch located in the switched circuit; and (g) wherein during dynamic braking of the vehicle the dynamic braking switch is closed and electric power generated by the traction motors is transmitted to the primary electric power generator to rotate the engine and drive the secondary electric power generator to power the auxiliary equipment on the vehicle during braking of the vehicle without fueling the engine.

10. The system of claim 9 further comprises an engine controller for controlling the delivery of fuel to the engine.

11. The system of claim 9 further comprising a braking controller for controlling the operation of the dynamic braking switch.

12. The system of claim 9 further comprising an engine compression braking system.

13. The system of claim 9 wherein horsepower from said compression braking system is varied by changing said engine's speed independently of speed of said vehicle's wheels.

* * * * *